US008963441B2

United States Patent
Tan et al.

(10) Patent No.: US 8,963,441 B2
(45) Date of Patent: Feb. 24, 2015

(54) PIXEL UNIT DRIVING CIRCUIT AND METHOD, PIXEL UNIT OF AMOLED PIXEL UNIT PANEL AND DISPLAY APPARATUS

(75) Inventors: Wen Tan, Beijing (CN); Xiaojing Qi, Beijing (CN)

(73) Assignees: Boe Technology Group Co., Ltd., Beijing (CN); Chengdu Boe Optoelectronics Technology Co., Ltd., Chengdu, Sichuan (CN)

( * ) Notice: Subject to any disclaimer, the term of this patent is extended or adjusted under 35 U.S.C. 154(b) by 130 days.

(21) Appl. No.: 13/806,209

(22) PCT Filed: Aug. 23, 2012

(86) PCT No.: PCT/CN2012/080521
§ 371 (c)(1),
(2), (4) Date: Dec. 21, 2012

(87) PCT Pub. No.: WO2013/026405
PCT Pub. Date: Feb. 28, 2013

(65) Prior Publication Data
US 2013/0134897 A1 May 30, 2013

(30) Foreign Application Priority Data
Aug. 25, 2011 (CN) .......................... 2011 1 0247221

(51) Int. Cl.
*H05B 37/00* (2006.01)
*G09G 3/30* (2006.01)
(Continued)

(52) U.S. Cl.
CPC .............. *H05B 33/0896* (2013.01); *G09G 3/32* (2013.01); *G09G 3/325* (2013.01); *Y02B 20/347* (2013.01)
USPC ........... 315/226; 345/76; 315/169.4; 315/167

(58) Field of Classification Search
CPC .................................. H05B 37/00; G09G 3/30
USPC .............. 345/76; 315/169.4, 169.1, 167, 226
See application file for complete search history.

(56) References Cited

U.S. PATENT DOCUMENTS 6,774,877 B2 *  8/2004  Nishitoba et al. ............... 345/76
6,859,193 B1 *  2/2005  Yumoto ........................... 345/82
(Continued)

FOREIGN PATENT DOCUMENTS

CN          1312535 A       9/2001
CN        102708786 A      10/2012
(Continued)

OTHER PUBLICATIONS

First Chinese Office Action dated Jan. 27, 2014 Appln. No. 201110247221.5
(Continued)

*Primary Examiner* — Douglas W Owens
*Assistant Examiner* — Wei Chan
(74) *Attorney, Agent, or Firm* — Ladas & Parry LLP (57) ABSTRACT

The present disclosure discloses a pixel unit driving circuit and method, and a pixel unit of an Active Matrix Organic Light Emitting Diode AMOLED panel and a display apparatus. The pixel unit driving circuit of the AMOLED panel comprises: a switching unit, a first input terminal of which is connected to a current source for providing a charging current, a second input terminal of which is connected to an Organic Light-Emitting Diode, and an output terminal of which is connected to a first terminal of a storage capacitor to provide the charging current; the storage capacitor, a first terminal of which is connected to the output terminal of the switching unit, and a second terminal of which is connected to a low level; a driving Thin Film Transistor and a current mirror Thin Film Transistor, gates of which are connected to the first terminal of the storage capacitor, and sources of which are connected to the low level; a voltage-dividing Thin Film Transistor, gate of which is connected to the first terminal of the storage capacitor, a source of which is connected to a drain of the driving Thin Film Transistor, and a drain of which is connected to the Organic Light-Emitting Diode.

9 Claims, 3 Drawing Sheets

(51) Int. Cl.
    *H05B 33/08* (2006.01)
    *G09G 3/32* (2006.01)

(56) References Cited

U.S. PATENT DOCUMENTS

| | | | | |
|---|---|---|---|---|
| 7,193,591 | B2* | 3/2007 | Yumoto | 345/82 |
| 7,414,599 | B2* | 8/2008 | Chung et al. | 345/76 |
| 7,773,054 | B2* | 8/2010 | Jeong | 345/76 |
| 7,795,618 | B2* | 9/2010 | Yamazaki et al. | 257/59 |
| 7,800,556 | B2* | 9/2010 | Chen et al. | 345/76 |
| 7,800,564 | B2* | 9/2010 | Numao | 345/82 |
| 7,859,491 | B2* | 12/2010 | Lee et al. | 345/76 |
| 8,049,684 | B2* | 11/2011 | Kim | 345/76 |
| 8,482,491 | B2* | 7/2013 | Kimura | 345/76 |
| 2001/0019327 | A1 | 9/2001 | Kim et al. | |
| 2003/0174152 | A1* | 9/2003 | Noguchi | 345/690 |
| 2004/0056828 | A1* | 3/2004 | Choi et al. | 345/82 |
| 2005/0200300 | A1* | 9/2005 | Yumoto | 315/169.1 |
| 2006/0063298 | A1* | 3/2006 | Winters | 438/99 |
| 2006/0139259 | A1 | 6/2006 | Choi et al. | |
| 2006/0220581 | A1* | 10/2006 | Yamazaki et al. | 315/169.3 |
| 2006/0232521 | A1* | 10/2006 | Jang et al. | 345/76 |
| 2006/0256046 | A1* | 11/2006 | Kimura | 345/76 |
| 2006/0267509 | A1* | 11/2006 | Yang | 315/169.3 |
| 2007/0268220 | A1* | 11/2007 | Lee et al. | 345/76 |
| 2007/0296671 | A1* | 12/2007 | Han et al. | 345/92 |
| 2008/0106208 | A1* | 5/2008 | Choi et al. | 315/169.3 |
| 2008/0170053 | A1* | 7/2008 | Chiou | 345/205 |
| 2008/0238327 | A1* | 10/2008 | Cho et al. | 315/169.3 |
| 2011/0069099 | A1* | 3/2011 | Sun | 345/698 |
| 2011/0234734 | A1* | 9/2011 | Nagumo | 347/132 |
| 2012/0161637 | A1* | 6/2012 | Lee et al. | 315/122 |
| 2013/0043796 | A1* | 2/2013 | Ko et al. | 315/151 |
| 2013/0069537 | A1* | 3/2013 | Sun et al. | 315/123 |

FOREIGN PATENT DOCUMENTS

| | | |
|---|---|---|
| EP | 1 130 565 A1 | 9/2001 |
| TW | 529006 B | 4/2003 |

OTHER PUBLICATIONS

International Preliminary Report on Patentability dated Feb. 25, 2014; PCT/CN2012/080521.

International Search Report; Dated Jun. 12, 2012; PCT/CN2012/080521.

Second Chinese Office Action Appln. No. 201110247221.5; Issued Sep. 2, 2014.

* cited by examiner

PIXEL UNIT DRIVING CIRCUIT AND METHOD, PIXEL UNIT OF AMOLED PIXEL UNIT PANEL AND DISPLAY APPARATUS

TECHNICAL FIELD OF THE DISCLOSURE

The present disclosure relates to driving technology for display panel, and particularly to a pixel unit driving circuit and method, a pixel unit of an Active Matrix Organic Light-Emitting Diode (AMOLED) panel and a display apparatus.

BACKGROUND

Figure 1:
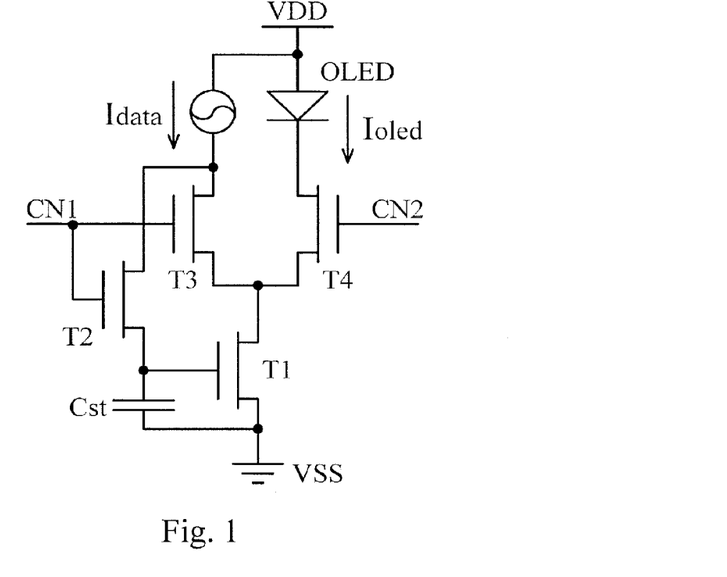
FIG. 1 is a principal diagram showing a pixel structure of an existing basic current mode AMOLED panel.

Organic Light-Emitting Diode (OLED) of each pixel in an AMOLED panel is capable of emitting light when it is driven by a current generated by a driving Thin Film Transistor (TFT) in a saturated state. That is, the OLED is driven by the current to emit light. FIG. 1 is a principal diagram showing a pixel structure of an existing basic current mode AMOLED panel. As shown in FIG. 1, the pixel structure of the existing basic current mode AMOLED panel includes an OLED, a T1, a T2, a T3, a T4 and a storage capacitor Cst, wherein the T1 is a driving Thin Film Transistor, the T2, T3 and T4 are controlling Thin Film Transistors, a gate of the T2 and a gate of the T3 are connected to a control line for outputting a control signal CN1, a gate of the T4 is connected to a control line for outputting a control signal CN2. In the pixel structure of the existing basic current mode AMOLED panel, a driving current Idata is externally applied so as to set a voltage on the storage capacitor Cst, and then generates a driving current Ioled for driving OELD to emit light. In the pixel structure of the existing basic current mode AMOLED panel, the Ioled is equal to the Idata, but the Ioled is small since it has to be in a operation current range of the OLED, and in turn the Idata is also small. However, the storage capacitor Cst usually has a large capacitance, so a charging speed thereof is slow when the Idata is small, thus a charging time is especially long under a low gray level, which is not suitable for AMOLED panel display with high solution and high refresh frequency.

SUMMARY

Embodiments of the present disclosure provides a pixel unit driving circuit and method, a pixel unit of an Active Matrix Organic Light-Emitting Diode (AMOLED) panel and a display apparatus, which enables a large ratio between a charging current Idata and a current Ioled flowing through the OLED, and makes sure that the Ioled is in the operation current range of OLED while the Idata may be a large current, thus the charging speed to the storage capacitor Cst is fastened.

According to one aspect of the present disclosure, a pixel unit driving circuit of an Active Matrix Organic Light Emitting Diode AMOLED panel, for driving the OLED, comprising:

a switching unit, a first input terminal of which is connected to a current source for providing a charging current, a second input terminal of which is connected to the OLED, and an output terminal of which is connected to a first terminal of a storage capacitor Cst to provide the charging current;

the storage capacitor, a first terminal of which is connected to the output terminal of the switching unit, and a second terminal of which is connected to a low level;

a driving Thin Film Transistor and a current mirror Thin Film Transistor, gates of which are connected to the first terminal of the storage capacitor, and sources of which are connected to the low level;

a voltage-dividing Thin Film Transistor, gate of which is connected to the first terminal of the storage capacitor, a source of which is connected to a drain of the driving Thin Film Transistor, and a drain of which is connected to the OLED;

wherein the switching unit turns on a path from the first input terminal to the drain of the current mirror Thin Film Transistor and a path from a second input terminal to the drain of the driving Thin Film Transistor, and turns off a path from the first input terminal to the drain of the driving Thin Film Transistor and a path from a second input terminal to the drain of the current mirror Thin Film Transistor, during a fist time period; and the switching unit also turns off the paths from the first input terminal to the drain of the current mirror Thin Film Transistor and the drain of the driving Thin Film Transistor, and turns off the paths from the second input terminal to the drain of the current mirror Thin Film Transistor and the drain of the driving Thin Film Transistor, during a second time period.

In one example, a threshold voltage of the driving Thin Film Transistor, a threshold voltage of the current mirror Thin Film Transistor, and a threshold voltage of the voltage-dividing Thin Film Transistor are equal to each other.

In one example, the switching unit comprises a fourth switching element, a fifth switching element and a sixth switching element, wherein, the gate of the driving Thin Film Transistor and the gate of the current mirror Thin Film Transistor are connected to the current source through the fifth switching element;

the drain of the current mirror Thin Film Transistor is connected to the current source through the fourth switching element;

the drain of the driving Thin Film Transistor is connected to the OLED through the sixth switching element;

the fourth switching element turns on a connection between the drain of the current mirror Thin Film Transistor and the current source during the first time period, and turns off the connection between the drain of the current mirror Thin Film Transistor and the current source during the second time period;

the fifth switching element turns on a connection among the gate of the driving Thin Film Transistor, the gate of the current mirror Thin Film Transistor and the current source during the first time period, and turns off the connection among the gate of the driving Thin Film Transistor, the gate of the current mirror Thin Film Transistor and the current source during the second time period; and the sixth switching element turns on a connection between the drain of the driving Thin Film Transistor and the OLED during the first time period, and turns off the connection between the drain of the driving Thin Film Transistor and the OLED during the second time period.

In one example, the driving Thin Film Transistor, the current mirror Thin Film Transistor, the voltage-dividing Thin Film Transistor, the fourth switching element, the fifth switching element and the sixth switching element are n type TFTs.

According to another aspect of the present disclosure, a pixel unit driving method of an Active Matrix Organic Light Emitting Diode AMOLED panel being applied in the above pixel unit driving circuit of AMOLED panel, comprising:

a pixel charging step: turning on a path from a current source for providing a charging current to a drain of a current mirror Thin Film Transistor, turning on a path from an OLED to a drain of a driving Thin Film Transistor, controlling the current source to charge a storage capacitor, and controlling the charging current provided by the current source to be divided into two parts to flow through the driving Thin Film Transistor and the current mirror Thin Film Transistor, respectively;

a light emitting step: driving the OLED to emit light through the voltage-dividing Thin Film Transistor and the driving Thin Film Transistor.

According to another aspect of the present disclosure, a pixel unit of an Active Matrix Organic Light Emitting Diode AMOLED panel comprises an OLED and the pixel unit driving circuit of the AMOLED panel described above, the pixel unit driving circuit of the AMOLED panel is connected to a cathode of the OLED, and an anode of the OLED is connected to a power line having an output voltage of VDD.

According to still another aspect of the present disclosure, a display apparatus comprises a plurality of above pixel unit of AMOLED panel.

The pixel unit driving circuit and method, the pixel unit of AMOLED panel and the display apparatus according to the embodiments of the present disclosure adopt a current mirror structure and a voltage-dividing circuit to obtain a large ratio between a charging current Idata and a current Ioled flowing through the OLED, so as to make sure that Ioled is in the operation current range of OLED while the Idata may be a large current, which fastens the charging speed to the storage capacitor.

DETAILED DESCRIPTION

Figure 2:
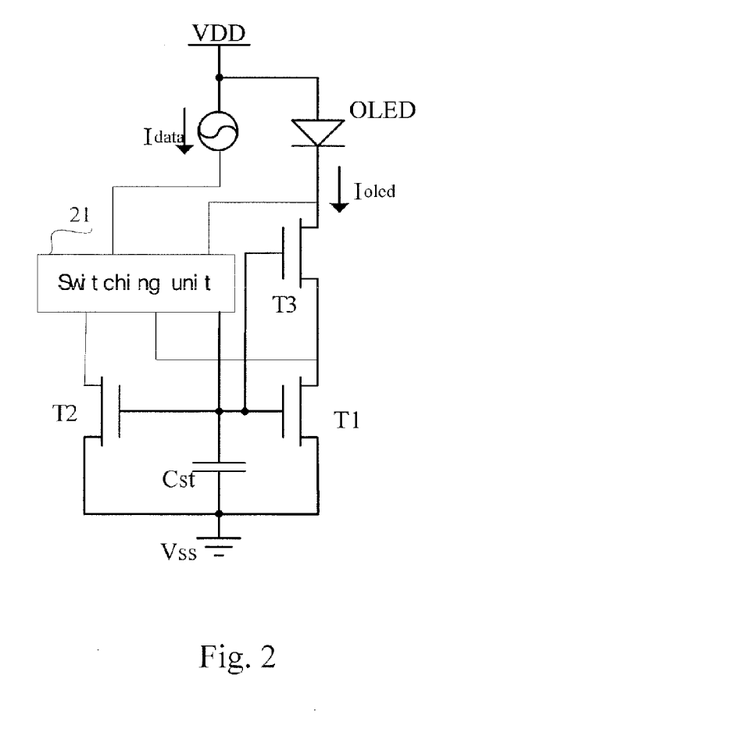
FIG. 2 is a circuit diagram showing a particular embodiment of a pixel unit of an AMOLED panel according to the embodiments of the present disclosure.

As shown in FIG. 2, the embodiments of the present disclosure provides a pixel unit driving circuit of an AMOLED panel, for driving OLED, the pixel unit driving circuit of the AMOLED panel comprises:

a switching unit 21, a first input terminal of which is connected to a current source for providing a charging current Idata, a second input terminal of which is connected to the OLED, and an output terminal of which is connected to a first terminal of a storage capacitor Cst to provide the charging current;

the storage capacitor Cst, a first terminal of which is connected to the output terminal of the switching unit 21, and a second terminal of which is connected to a low level Vss;

a driving Thin Film Transistor T1 and a current mirror Thin Film Transistor T2, gates of which are connected to the first terminal of the storage capacitor Cst, and sources of which are connected to the low level Vss; and a voltage-dividing Thin Film Transistor, gate of which is connected to the first terminal of the storage capacitor Cst, a source of which is connected to a drain of the driving Thin Film Transistor T1, and a drain of which is connected to the OLED;

wherein the switching unit 21 turns on a path from the first input terminal to the drain of the current mirror Thin Film Transistor T2 and a path from a second input terminal to the drain of the driving Thin Film Transistor T1, and turns off a path from the first input terminal to the drain of the driving Thin Film Transistor T1 and a path from a second input terminal to the drain of the current mirror Thin Film Transistor T2, during a fist time period; and the switching unit 21 also turns off the paths from the first input terminal to the drain of the current mirror Thin Film Transistor T2 and the drain of the driving Thin Film Transistor T1, and the paths from the second input terminal to the drain of the current mirror Thin Film Transistor T2 and the drain of the driving Thin Film Transistor T1, during a second time period.

In an example, a threshold voltage of the driving Thin Film Transistor T1, a threshold voltage of the current mirror Thin Film Transistor T2, and a threshold voltage of the voltage-dividing Thin Film Transistor T3 may be equal to each other.

In an example, the switching unit 21 may comprise a fourth switching element, a fifth switching element and a sixth switching element, wherein, the gate of the driving Thin Film Transistor T1 and the gate of the current mirror Thin Film Transistor T2 are connected to the current source through the fifth switching element;

the drain of the current mirror Thin Film Transistor T2 is connected to the current source through the fourth switching element;

the drain of the driving Thin Film Transistor T1 is connected to the OLED through the sixth switching element;

the fourth switching element turns on a connection between the drain of the current mirror Thin Film Transistor T2 and the current source during the first time period, and turns off the connection between the drain of the current mirror Thin Film Transistor T2 and the current source during the second time period;

the fifth switching element turns on a connection among the gate of the driving Thin Film Transistor T1, the gate of the current mirror Thin Film Transistor T2 and the current source during the first time period, and turns off the connection among the gate of the driving Thin Film Transistor T1, the gate of the current mirror Thin Film Transistor T2 and the current source during the second time period; and the sixth switching element turns on a connection between the drain of the driving Thin Film Transistor T1 and the OLED during the first time period, and turns off the connection between the drain of the driving Thin Film Transistor T1 and the OLED during the second time period.

In an example, the driving Thin Film Transistor T1, the current mirror Thin Film Transistor T2, the voltage-dividing Thin Film Transistor T3, the fourth switching element, the fifth switching element and the sixth switching element may be n type TFTs.

Embodiments of the present disclosure also provide a pixel unit driving method of an AMOLED panel for driving the above mentioned pixel unit driving circuit of the AMOLED panel.

According to a particular implementation, the pixel unit driving method of the AMOLED panel comprises the following steps:

a pixel charging step: turning on a path from a current source for providing a charging current to a drain of a current mirror Thin Film Transistor, turning on a path from an OLED to a drain of a driving Thin Film Transistor, controlling the current source to charge a storage capacitor, and controlling the charging current provided by the current source to be divided into two parts to flow through the driving Thin Film Transistor and the current mirror Thin Film Transistor, respectively;

a light emitting step: driving the OLED to emit light through the voltage-dividing Thin Film Transistor and the driving Thin Film Transistor.

Embodiments of the present disclosure also provides a pixel unit of an AMOLED panel, comprising OLED and the above described pixel unit driving circuit of the AMOLED panel, the pixel unit driving circuit of the AMOLED panel is connected to a cathode of the OLED, and a anode of the OLED is connected to a power line having an output voltage of VDD.

In one example, In an example, a threshold voltage of the driving Thin Film Transistor T1, a threshold voltage of the current mirror Thin Film Transistor T2, and a threshold voltage of the voltage-dividing Thin Film Transistor T3 may be equal to each other.

In an example, the switching unit 21 may comprise a fourth switching element, a fifth switching element and a sixth switching element, wherein, the gate of the driving Thin Film Transistor T1 and the gate of the current mirror Thin Film Transistor T2 are connected to the current source through the fifth switching element;

the drain of the current mirror Thin Film Transistor T2 is connected to the current source through the fourth switching element;

the drain of the driving Thin Film Transistor T1 is connected to the OLED through the sixth switching element;

the fourth switching element turns on a connection between the drain of the current mirror Thin Film Transistor T2 and the current source during the first time period, and turns off the connection between the drain of the current mirror Thin Film Transistor T2 and the current source during the second time period; and the fifth switching element turns on a connection among the gate of the driving Thin Film Transistor T1, the gate of the current mirror Thin Film Transistor T2 and the current source during the first time period, and turns off the connection among the gate of the driving Thin Film Transistor T1, the gate of the current mirror Thin Film Transistor T2 and the current source during the second time period;

the sixth switching element turns on a connection between the drain of the driving Thin Film Transistor T1 and the OLED during the first time period, and turns off the connection between the drain of the driving Thin Film Transistor T1 and the OLED during the second time period.

In an example, the driving Thin Film Transistor T1, the current mirror Thin Film Transistor T2, the voltage-dividing Thin Film Transistor T3, the fourth switching element, the fifth switching element and the sixth switching element may be n type TFTs.

Embodiments of the present disclosure also provide a display apparatus comprising a plurality of above described pixel unit of the AMOLED panel.

Figure 3:
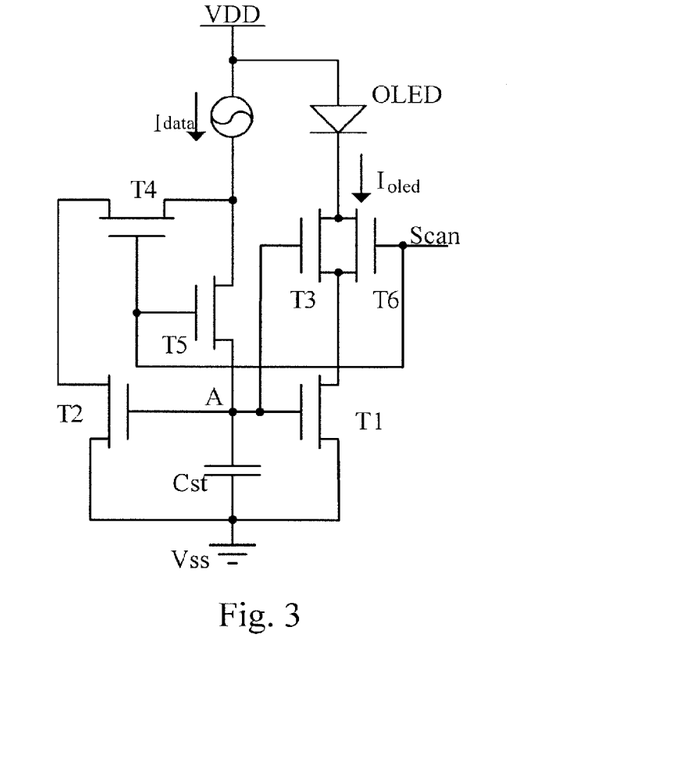
FIG. 3 is a circuit diagram showing another particular embodiment of a pixel unit of an AMOLED panel according to the embodiments of the present disclosure.

FIG. 3 is a circuit diagram showing connection between a particular embodiment of a pixel unit driving circuit of an AMOLED panel according to embodiments of the present disclosure and the OLED, that is, a circuit diagram of a particular embodiment of a pixel unit of the AMOLED panel according to embodiments of the present disclosure. The pixel unit driving circuit of the AMOLED panel of the present embodiment adopts a circuit of a 6T1C structure and also adopts a current mirror circuit and a voltage-dividing mode to obtain a large ratio between a charging current Idata and a current Ioled flowing through the OLED, so as to make sure that the Ioled is in the operation current range of the OLED while the Idata may be a large current, which fastens the charging speed to the storage capacitor Cst and solves the problem that a low charging speed appearing in pixels of a traditional current mode AMOLED panel due to a small charging current.

As shown in FIG. 3, all of the T1 to T6 are n type TFTs, wherein the T1 is a driving Thin Film Transistor, the T2 is a current mirror Thin Film Transistor, the T3 is a voltage-dividing Thin Film Transistor, and the T4, T5 and T6 are controlling Transistors, and a Cst is a storage capacitor Cst.

The T1 and T2 have a common gate and a common source, and form a current mirror, the common gate A of the T1 and T2 is connected to a first terminal of the storage capacitor Cst, the common source of the T1 and T2 is connected to a second terminal of the storage capacitor Cst and to a low level Vss;

The T2 is connected to a current source for providing a charging current Idata through the T4, a drain of the T4 is connected to a drain of the T2, a source of the T4 is connected to a drain of the T5 and the current source, and gates of the T4, T5 and T6 are connected to a control line for providing control signal Scan;

a source of the T5 is connected to a gate of the T1, a gate of the T2 and a first terminal of the storage capacitor Cst;

T3 and T6 have a common drain and a common source, the common source of the T3 and T6 is connected to a drain of the T1, the common drain of the T3 and T6 is connected to a cathode of the OLED, and a gate of the T3 is connected to the gate of the T1;

the T4 and T5 perform control so that the charging current Idata charges the storage capacitor Cst in the pixel during a charging stage, and the T1 and T3 turn on after the charging to the storage capacitor Cst is finished, so as to drive a current to flow through OLED and make OLED emitting light.

In the above Thin Film Transistors, gates of the T4, T5 and T6 are connected to the control signal Scan, and threshold voltages of the T1, T2 and T3 are equal to each other.

Figure 4:
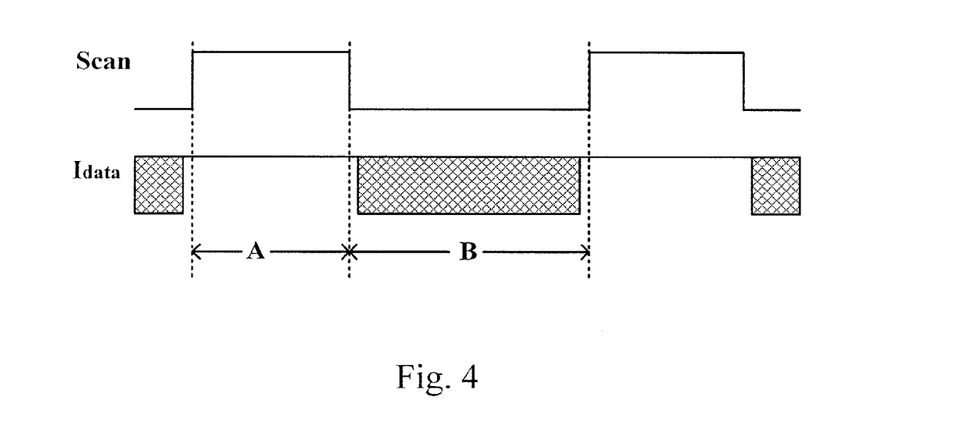
FIG. 4 is a timing sequence diagram showing a control signal Scan and a charging current Idata.

FIG. 4 is a timing sequence diagram of the control signal Scan and the charging current Idata.

Figure 5:
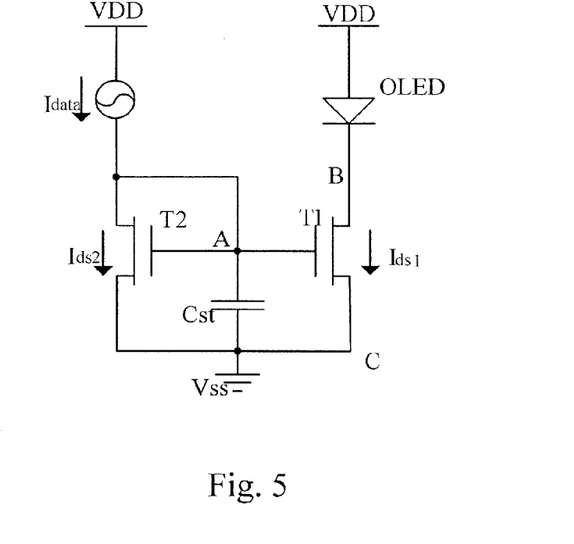
FIG. 5 is an equivalent circuit diagram of the particular embodiment of the pixel unit of an AMOLED panel according to the embodiments of the present disclosure during a fist time period.

As shown in FIG. 5, when the pixel unit driving circuit of an AMOLED panel according to embodiments of the present disclosure operates, during a first time period, that is, A stage (also called as a pixel charging stage), the Scan is in a high level, the T4, T5 and T6 turn on, and the T3 turns off;

The T2 is in a saturated state after being charged by the charging current Idata, the charging current Idata is equal to a saturated drain current Ids2. Due to addition of driving IC of the AMOLED panel module, the storage capacitor Cst is charged to a gate-source voltage of the T2, that is, a voltage difference between the first terminal and the second terminal of the storage capacitor Cst is: $Vgs=V_A-V_{SS}$;

since $Ids2 = \frac{1}{2}k2(Vgs - Vth)^2$, so $Idata = Ids2 = \frac{1}{2}k2(Vgs - Vth)^2$;

since gates of the T1 and T2 are connected with each other, the T1 also operates in a saturated region, then $$Ids1 = \frac{1}{2}k1(Vgs - Vth)^2;$$

T3 turns off, so Ids3=0;
Therefore, $$Idata = Ids2 = \frac{1}{2}k2(Vgs - Vth)^2 = \frac{1}{2}Ids1,$$

that is, $$Ids1 = \frac{1}{2}Idata.$$

Figure 6:
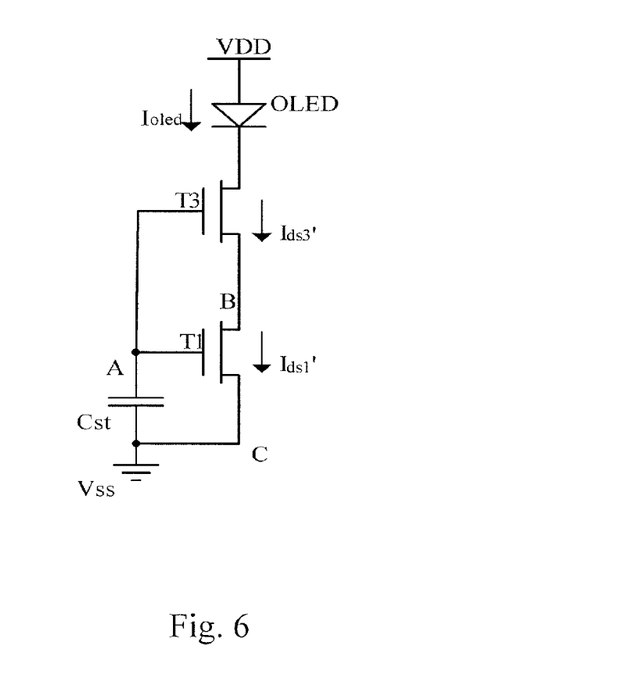
FIG. 6 is an equivalent circuit diagram of the particular embodiment of the pixel unit of an AMOLED panel according to the embodiments of the present disclosure during a second time period.

As shown in FIG. 6, when the pixel unit driving circuit of an AMOLED panel according to embodiments of the present disclosure operates, during a second time period, that is, B stage (also called as light emitting stage), Scan is in a low level, the T2, T4, T5 and T6 turn off, the T1 operates in a linear region, the T2 operates in the saturated region, the voltage across two terminals of the storage capacitor Cst still remains Vgs, the OLED turns on, and a gate-source voltage of T3 is: Vgs'=Vgs−V$_{BC}$.

During the second time period, the drain current of the T1 is:

$$Ids1' = k1\left[(Vgs - Vth) \times V_{BC} - \frac{1}{2}V_{BC}^2\right];$$

The drain current of T3 is:

$$Ids3' = \frac{1}{2}k3(Vgs' - Vth)^2$$

$$Ids3' = (Vgs' - Vth)^2$$

$$= [(Vgs - Vth)^2 - 2V_{BC}(Vgs - Vth) + V_{BC}2]$$

$$= (Vgs - Vth)^2 - k3 \times V_{BC}(Vgs - Vth) + \frac{1}{2}k3 \times V_{BC}^2];$$

Since Ids1'=Ids3'=Ioled, so $$\frac{1}{2}k3(Vgs-Vth)^2 - k3\times V_{BC}(Vgs-Vth) + \frac{1}{2}k3\times V_{BC}^2] =$$

$$k1(Vgs-Vth)\times V_{BC} - \frac{1}{2}k1\times V_{BC}^2$$

Then, we can obtain:

$$\frac{k3}{k1}\times Ids1 - (k1+k3)\times V_{BC}(Vgs-Vth) + \frac{1}{2}(k1+k3)\times V_{BC}^2 = 0;$$

$$\frac{k3}{k1}\times Ids1 - (k1+k3)\times [V_{BC}(Vgs-Vth) - V_{BC}^2] = 0;$$

$$\frac{k3}{k1}\times Ids1 - k1\left(1+\frac{k3}{k1}\right)[V_{BC}(Vgs-Vth) - V_{BC}^2] = 0;$$

-continued $$\text{So } Ids1 = \frac{k1+k3}{k3}\times Ids1'.$$

Since Ioled=Ids1' and $$ds1 = \frac{k1}{k2}\times Idata,$$

So we can obtain $$\frac{Idata}{Ioled} = \frac{k1}{k2}\times\frac{k1+k3}{k3},$$

wherein k1, k2 and k3 are constants concerning the structure and the process of the Transistors T1, T2 and T3, respectively.

Therefore, Ioled is a current in proportion to Idata, and values of k1, k2 and k3 can be configured so that the current ratio between Ioled and Idata may be large.

Finally, in the pixel unit of an AMOLED panel according to the particular embodiment, the current ratio between the charging current Idata and the driving current Ioled $$\frac{Idata}{Ioled} = \frac{k1}{k2}\times\frac{k1+k3}{k3}$$

is large. Therefore, there may be a large charging current Idata while Ioled is ensured to be in the operation current range of the OLED, so as to fasten the charging to the storage capacitor Cst.

The above descriptions are only for illustrating the embodiments of the present disclosure, and in no way limit the scope of the present disclosure. It will be obvious that those skilled in the art may make modifications, variations and equivalences to the above embodiments without departing the spirit and scope of the present disclosure as defined by the following claims. Such variations and modifications are intended to be comprised within the spirit and scope of the present disclosure.

What is claimed is:

1. A pixel unit driving circuit of an Active Matrix Organic Light Emitting Diode AMOLED panel, for driving an Organic Light-Emitting Diode, comprising:
   a switching unit, a first input terminal of which is connected to a current source for providing a charging current, a second input terminal of which is connected to the Organic Light-Emitting Diode, and an output terminal of which is connected to a first terminal of a storage capacitor to provide the charging current;
   the storage capacitor, a first terminal of which is connected to the output terminal of the switching unit, and a second terminal of which is connected to a low level;
   a driving Thin Film Transistor and a current mirror Thin Film Transistor, gates of which are connected to the first terminal of the storage capacitor, and sources of which are connected to the low level;
   a voltage-dividing Thin Film Transistor, a gate of which is connected to the first terminal of the storage capacitor, a source of which is connected to a drain of the driving Thin Film Transistor, and a drain of which is connected to the Organic Light-Emitting Diode;

wherein the switching unit turns on a path from the first input terminal to the drain of the current mirror Thin Film Transistor and a path from a second input terminal to the drain of the driving Thin Film Transistor, and turns off a path from the first input terminal to the drain of the driving Thin Film Transistor and a path from a second input terminal to the drain of the current mirror Thin Film Transistor, during a fist time period; and the switching unit also turns off the paths from the first input terminal to the drain of the current mirror Thin Film Transistor and the drain of the driving Thin Film Transistor, and the paths from the second input terminal to the drain of the current mirror Thin Film Transistor and the drain of the driving Thin Film Transistor, during a second time period.

2. The pixel unit driving circuit of the AMOLED panel of claim 1, wherein, a threshold voltage of the driving Thin Film Transistor, a threshold voltage of the current mirror Thin Film Transistor, and a threshold voltage of the voltage-dividing Thin Film Transistor are equal to each other.

3. The pixel unit driving circuit of AMOLED panel of claim 1, wherein the switching unit comprises a fourth switching element, a fifth switching element and a sixth switching element, wherein, the gate of the driving Thin Film Transistor and the gate of the current mirror Thin Film Transistor are connected to the current source through the fifth switching element;

the drain of the current mirror Thin Film Transistor is connected to the current source through the fourth switching element;

the drain of the driving Thin Film Transistor is connected to the Organic Light-Emitting Diode through the sixth switching element;

the fourth switching element turns on a connection between the drain of the current mirror Thin Film Transistor and the current source during the first time period, and turns off the connection between the drain of the current mirror Thin Film Transistor T2 and the current source during the second time period;

the fifth switching element turns on a connection among the gate of the driving Thin Film Transistor, the gate of the current mirror Thin Film Transistor and the current source during the first time period, and turns off the connection among the gate of the driving Thin Film Transistor, the gate of the current mirror Thin Film Transistor and the current source during the second time period; and the sixth switching element turns on a connection between the drain of the driving Thin Film Transistor and the Organic Light-Emitting Diode during the first time period, and turns off the connection between the drain of the driving Thin Film Transistor and the Organic Light-Emitting Diode during the second time period.

4. The pixel unit driving circuit of AMOLED panel of claim 3, wherein the driving Thin Film Transistor, the current mirror Thin Film Transistor, the voltage-dividing Thin Film Transistor, the fourth switching element, the fifth switching element and the sixth switching element are n type TFTs.

5. A pixel unit driving method of an Active Matrix Organic Light Emitting Diode AMOLED panel being applied in a pixel unit driving circuit of the AMOLED panel, comprising:

a pixel charging step: turning on a path from a current source for providing a charging current to a drain of a current mirror Thin Film Transistor, turning on a path from an Organic Light-Emitting Diode to a drain of a driving Thin Film Transistor, controlling the current source to charge a storage capacitor, and controlling the charging current provided by the current source to be divided into two parts to flow through the driving Thin Film Transistor and the current mirror Thin Film Transistor, respectively;

a light emitting step: driving the Organic Light-Emitting Diode to emit light through the voltage-dividing Thin Film Transistor and the driving Thin Film Transistor, wherein the pixel unit driving circuit of the AMOLED panel comprises:

a switching unit, a first input terminal of which is connected to a current source for providing a charging current, a second input terminal of which is connected to the Organic Light-Emitting Diode, and an output terminal of which is connected to a first terminal of a storage capacitor to provide the charging current;

the storage capacitor, a first terminal of which is connected to the output terminal of the switching unit, and a second terminal of which is connected to a low level;

a driving Thin Film Transistor and a current mirror Thin Film Transistor, gates of which are connected to the first terminal of the storage capacitor, and sources of which are connected to the low level;

a voltage-dividing Thin Film Transistor, gate of which is connected to the first terminal of the storage capacitor, a source of which is connected to a drain of the driving Thin Film Transistor, and a drain of which is connected to the Organic Light-Emitting Diode;

wherein the switching unit turns on a path from the first input terminal to the drain of the current mirror Thin Film Transistor and a path from a second input terminal to the drain of the driving Thin Film Transistor, and turns off a path from the first input terminal to the drain of the driving Thin Film Transistor and a path from a second input terminal to the drain of the current mirror Thin Film Transistor, during a fist time period; and the switching unit also turns off the paths from the first input terminal to the drain of the current mirror Thin Film Transistor and the drain of the driving Thin Film Transistor, and the paths from the second input terminal to the drain of the current mirror Thin Film Transistor and the drain of the driving Thin Film Transistor, during a second time period.

6. A pixel unit of an Active Matrix Organic Light Emitting Diode AMOLED panel, comprising an Organic Light-Emitting Diode and a pixel unit driving circuit, the pixel unit driving circuit is connected to a cathode of the Organic Light-Emitting Diode, and an anode of the Organic Light-Emitting Diode is connected to a power line having an output voltage of VDD, wherein the pixel unit driving circuit of the AMOLED panel comprises:

a switching unit, a first input terminal of which is connected to a current source for providing a charging current, a second input terminal of which is connected to the Organic Light-Emitting Diode, and an output terminal is connected to a first terminal of a storage capacitor to provide the charging current;

the storage capacitor, a first terminal of which is connected to the output terminal of the switching unit, and a second terminal of which is connected to a low level;

a driving Thin Film Transistor and a current mirror Thin Film Transistor, gates of which are connected to the first terminal of the storage capacitor, and sources of which are connected to the low level;

a voltage-dividing Thin Film Transistor, gate of which is connected to the first terminal of the storage capacitor, a source of which is connected to a drain of the driving Thin Film Transistor, and a drain of which is connected to the Organic Light-Emitting Diode;

wherein the switching unit turns on a path from the first input terminal to the drain of the current mirror Thin Film Transistor and a path from a second input terminal to the drain of the driving Thin Film Transistor, and turns off a path from the first input terminal to the drain of the driving Thin Film Transistor and a path from a second input terminal to the drain of the current mirror Thin Film Transistor, during a fist time period; and the switching unit also turns off the paths from the first input terminal to the drain of the current mirror Thin Film Transistor and the drain of the driving Thin Film Transistor, and the paths from the second input terminal to the drain of the current mirror Thin Film Transistor and the drain of the driving Thin Film Transistor, during a second time period.

7. The pixel unit of AMOLED panel of claim 6, wherein, a threshold voltage of the driving Thin Film Transistor, a threshold voltage of the current mirror Thin Film Transistor, and a threshold voltage of the voltage-dividing Thin Film Transistor are equal to each other.

8. The pixel unit of AMOLED panel of claim 6, wherein the switching unit comprises a fourth switching element, a fifth switching element and a sixth switching element, wherein, the gate of the driving Thin Film Transistor and the gate of the current mirror Thin Film Transistor are connected to the current source through the fifth switching element;

the drain of the current mirror Thin Film Transistor is connected to the current source through the fourth switching element;

the drain of the driving Thin Film Transistor is connected to the Organic Light-Emitting Diode \ through the sixth switching element;

the fourth switching element turns on a connection between the drain of the current mirror Thin Film Transistor and the current source during the first time period, and turns off the connection between the drain of the current mirror Thin Film Transistor T2 and the current source during the second time period;

the fifth switching element turns on a connection among the gate of the driving Thin Film Transistor, the gate of the current mirror Thin Film Transistor and the current source during the first time period, and turns off the connection among the gate of the driving Thin Film Transistor, the gate of the current mirror Thin Film Transistor and the current source during the second time period; and the sixth switching element turns on a connection between the drain of the driving Thin Film Transistor and OLED during the first time period, and turns off the connection between the drain of the driving Thin Film Transistor and OLED during the second time period.

9. The pixel unit of AMOLED panel of claim 8, wherein, the driving Thin Film Transistor, the current mirror Thin Film Transistor, the voltage-dividing Thin Film Transistor, the fourth switching element, the fifth switching element and the sixth switching element are n type TFTs.

* * * * *